Oct. 3, 1961 F. A. DAVIS ET AL 3,003,044

DELAY ELECTRIC SWITCH

Filed March 23, 1959

INVENTORS

Frank A. Davis

Harold H. Loesch

United States Patent Office 3,003,044
Patented Oct. 3, 1961

3,003,044
DELAY ELECTRIC SWITCH

Frank A. Davis, Box 115, Flat Rock, Ind., and Herold H. Losche, 541 Euclid Ave., Greenwood, Ind.

Filed Mar. 23, 1959, Ser. No. 801,348
6 Claims. (Cl. 200—33)

This invention relates to electric switches and more particularly to electric switches of the delay On and Off type preferably using an electrically conductive liquid for establishing and breaking electrical continuity.

Many well known delay On and Off electrical switches of the mechanical type have timing mechanisms to control the delay period and such mechanical switches have proven very successful in operation. Many are used today; however, such delay mechanical switches require considerable space since these mechanisms must be of a size to develop and control sufficient power to trip electrical contacts. These timing mechanisms, such as an escapement mechanism or a bi-metal detent mechanism, are also subject to wear necessitating occasional maintenance and replacement.

Also a number of delay On and Off electrical switches of the electrically conductive liquid type, such as mercury, are in use wherein the mercury is metered through a metering passage from one switch contact compartment to another to control the time of delay of the switch. As the necessity for greater time delay arises, a larger mercury column is needed requiring additional mercury. The whole control of the time delay of these mercury switches lies in the mercury metering passage and the amount of mercury used. If an error is made in the mercury metering passage, the mercury may not all pass therethrough and the time of delay anticipation destroyed.

Mercury is a very dense metallic liquid with an atomic weight of over 200 which makes its molecules highly cohesive in character. It is the only common metal that is liquid at ordinary temperatures, which makes it desirable for electrical switches, and it does not readily combine with other elements, metallic or non-metallic, to change its characteristics for reducing its cohesion factor which might aid in the control thereof through metering passages. It is most advantageous to use mercury in its pure state for electrical switches.

In the present invention the inherent characteristics of mercury are utilized to an advantage. Recognizing that mercury is dense and highly cohesive, which makes it cling together and resist separation or "stringing out" in metering passages, the mercury in the switch structure of this invention is effectively metered but is permitted to flow through passages without passage metering. In this invention the control of the flow of the mercury from one electrical switch compartment to another is by the accurate control of the air compressed or displaced by the mercury attendant to the flow of the mercury between compartments. Thus, the time delay of the mercury flow is dependent on the control of the air which it displaces and air can be very accurately metered whereas mercury cannot be accurately metered in the small quantity used in electrical switches. The mercury can be timed so accurately in this invention by metering the displaced air that the mercury will transfer from one electrical switch chamber or compartment to the other in globules, and even the frequency of these globules may be timed by displaced air metering. Consequently, a mercury switch, using little more mercury than the standard On-Off mercury switch, can be made to delay the time On or Off from zero to several minutes without change in mercury volume. It is also possible to adjustably control the time delay period by placing an adjustable control valve in the air metering passage.

While this invention is not limited to electric mercury switches for any particular purpose, the invention is shown in an application of use in the conventional electric switch box ordinarily used in house circuits to control house lights or other appliances or equipment purely to provide an illustration and example and not in any way to limit the practical use in other applications. It is therefore a general object of this invention to provide a time delayed electrical mercury switch to control the break or establishment of electrical continuity in a predetermined fixed or adjustable time period of activation.

These and other objects, advantages, features, uses, and constructions will become more apparent to those skilled in the art as the description proceeds in greater detail when considered along with the accompanying drawing, in which.

Figure 1:
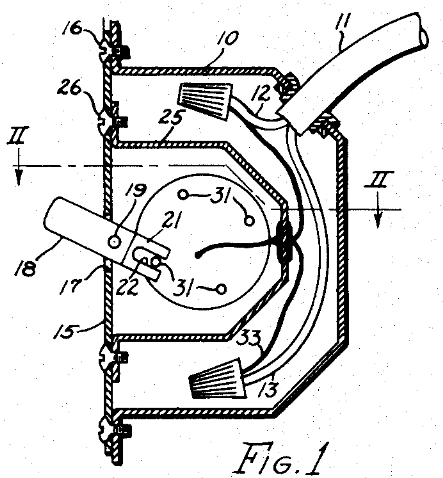
FIGURE 1 shows a partially sectional and partially elevational view of the switch of this invention within a conventional electric switch box.
Figure 2:
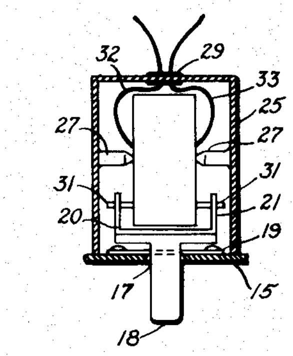
FIGURE 2 shows a partially sectional and partially elevational view of the switch of this invention taken along the line II—II of FIGURE 1.

Referring more particularly to FIGURES 1 and 2 of the drawing, there is illustrated in cross-section an ordinary electric switch box 10 for fixing in a wall (not shown) and having a cable of switch wires 11 entering therein in the usual manner. The cable covering is removed inside the box 10 to expose electrically insulated leads 12 and 13.

Mounted on the switch box 10 in the usual manner is a switch support plate 15 as by cap screws 16. Pivoted in a slot 17 centrally of the switch support plate 15 is a switch toggle 18 journalled on a shaft 19 fixed to the switch support plate 15 by metal upsetting, soldering, welding, or other suitable means. The inner end of the toggle 18 is separated into two arms 20 and 21, each arm being bifurcated to produce an elongated slot 22 therein opening rearwardly from the inner end. Only one arm 20 or 21 may be used, if desired, since one would be sufficient to actuate the switch.

A mercury switch capsule container 25, closed on all sides except the side fastened to the switch support plate, is fastened by cap screws 26 to the plate 15 to form a completely enclosed container that is readily detachable for access to the switch parts. The container 25 has a pair of inwardly extending aligned journal pivots 27 having conical bearing ends interfitting conical depressions 28 on opposite sides of a mercury switch capsule 30, later to be more fully described. The mercury switch capsule 30 has pins 31 extending outwardly from the sides of the capsule and parallel to the axis through the conical bearing depressions 28, the pins 31 slidably interfitting within the bifurcated slot portions 22 of the toggle 18. The additional pins 31 shown disposed about the capsule at different positions may be used for different angular positions of the switch actuator means or toggle 18; that is, where the switch is mounted on a table top, on a ceiling, or in any other angular position. The container 25 has an opening 29 in the rear wall thereof to allow passage of mercury switch capsule leads 32 and 33.

From the above detailed description of FIGURES 1 and 2 it should readily appear apparent that actuation of the toggle 18 from the position shown in FIGURE 1 to a downward position will cause the mercury capsule 30 to rotate clockwise, as viewed in FIGURE 1, for approximately eighty or ninety degrees. The journal points 27 and 28 can be made sufficiently tight to provide the resistance necessary to hold the mercury capsule in any rotated position. The leads 32 and 33 may be of stranded wire or a looped single wire so that they will not fatigue from capsule oscillations. The leads 32 and 33 may be soldered to the inner electrodes of the capsule as will later be more fully described.

Figure 4:
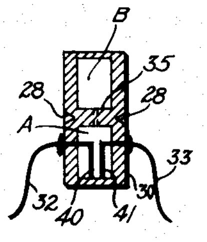
FIGURE 4 shows a cross-sectional view of the mercury capsule revealing the electrodes.
Figure 5:
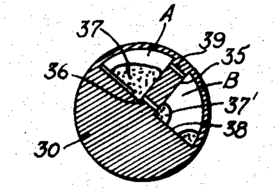
FIGURE 5 illustrates the mercury capsule in a delay Off position.

Referring now more particularly to FIGURES 3 to 6, inclusive, the mercury capsule 30 is shown in diametrical cross-section to reveal its inner portions. The capsule 30 may be made of glass, plastic, or any other nonconductive material suitable for hermetically sealing the mercury and the electrodes. The capsule 30 is illustrated as being round and as having two sector-shaped compartments A and B therein separated by a division wall 35. The capsule 30 is normally operated with the wall 35 oscillated back and forth of a vertical plane. The lower end of the wall 35 has an opening 36 therethrough for permitting the transfer of mercury 37 therethrough by gravity. The opening or passage 36 may be drilled or otherwise formed and is positioned sufficiently above the floor 38 of the chambers or compartments A and B to cause some mercury to be retained in the higher chamber. The passage 36 is not so small as to cause metering of the mercury and not so large as to allow air to pass in opposite direction to the passage of mercury. Near the top of the wall 35 is a metered air passage 39 to control the volumetric flow of air between chambers A and B as the mercury is transferred by gravity between chambers A and B; that is, as the mercury passes from, for example, chamber A to chamber B, air is displaced or compressed in chamber B to create a little vacuum in chamber A thereby causing the air to flow from chamber B to chamber A. Passage 39 meters this flow of air to retard the flow of mercury between chambers A to B. This metering passage 39 may be so small so as to cause the mercury to break up into globules, as shown in FIGURE 5 by 37', in its transfer from chambers A to B. Likewise, the speed of passage of the mercury globules from chambers A to B can be controlled by the metering passage 39. By proper calibration of the metering passage 39 the time lapse for all but a last globule of the mercury 37 from chamber A to chamber B, or vice versa, is established. The size of the last globule retained in chamber A (or B) can be fixed by the height of passage 36 above the floor 38 and by the size of passage 36.

Figure 6:
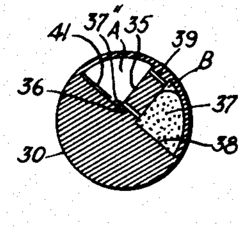
FIGURE 6 shows the mercury capsule in the same position as it is shown in FIGURE 5 after the delay time has elapsed.

Affixed by imbedding or otherwise in the floor 38 of chamber A is a pair of electrodes 40 and 41, as best seen in FIGURE 4. These electrodes are arranged in parallel relation extending inwardly from the capsule's peripheral wall to a point outwardly from the division wall 35 sufficiently to allow a globule of mercury to rest against the division wall 35 without bridging the electrodes 40 and 41, as seen in FIGURE 6. The inner end of each electrode 40 and 41 makes right angle bends through the side walls of the capsule 30 to the exterior where they each are soldered or otherwise connected to the leads 32 and 33.

Figure 7:
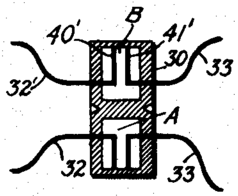
FIGURE 7 illustrates a modification of the mercury capsule to enable electric control of an electrical device from two remote points.

Referring more particularly to FIGURE 7, where like parts are identified by like reference characters, electrodes 40' and 41' are placed in chamber B with leads 32' and 33' attached thereto in like manner as shown in FIGURES 3 to 6, inclusive, for the like parts. This switch can be used as a three-pole-double-throw switch for delay timing by tying two of each of the leads together, as 32 and 32' or 33 and 33', or the switch can be used as a double-throw-double-pole switch.

Figure 8:
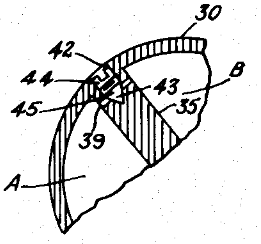
FIGURE 8 illustrates a fragmentary cross-sectional modification of the mercury capsule to provide adjustable metering of displaced or compressed air to control the time delay period.

Referring to FIGURE 8 showing a fragmentary sectional view of the mercury capsule 30, the division wall 35 of the capsule 30 may have an adjustable air metering valve in the air passage 39. A blind bore 42 enters radially inwardly through the peripheral circumference of the capsule 30 directly over the division wall 35 and the metering passage 39 terminating in a conical valve seat 43. The blind bore 42 is threaded to receive a threaded valve 44 having a conical valve face 45 to match the valve seat 43. The conical valve face and seat are of the type known as a "needle valve" which has capabilities of providing accurate metering of a small volume air or liquid passage. This "needle valve" may be used to control the metering passage 39 of the mercury capsule illustrated in FIGURES 3 to 7, inclusive, to adjust the delay time of the switch.

Figure 3:
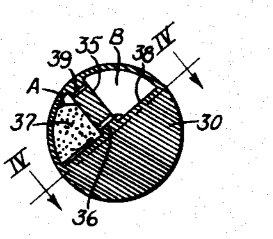
FIGURE 3 shows a diametrical sectional view of the switch mercury capsule in an electric circuit continuity position.

The operation of the time delay switch of this invention is believed to be apparent from the detailed description. It can be seen that the switch resting in the position shown in FIGURE 1, which positions the mercury capsule as shown in FIGURE 3, establishes electrical continuity between its leads 32 and 33 which may be termed the On position. Mercury 37 in this switch position spans or bridges the electrodes 40 and 41. Upon throwing toggle 18 down, the mercury capsule 30 will immediately assume the position shown in FIGURE 5 and the mercury 37 will flow, in globules if the time lapse is long enough, from chamber A to chamber B. Flow of each globule from chambers A to B will compress air in chamber B which bleeds through metering passage 39 to chamber A, the degree of metering the air determining the delay time interval before the mercury 37 breaks bridgement of the electrodes 40 and 41 at which time electrical continuity is broken and the switch circuit is Off. By reason of the position of the passage 36 above the floor 38 and the size of the passage 36 at which size the mercury cohesion properties are stronger than the pull of gravity, the last globule of mercury will not pass through the passage 36 to chamber B. When the switch is again thrown to the On position, this last globule, shown as 37'', will immediately bridge the electrodes 40 and 41 to establish an On circuit. By lowering the passage 36 to the floor 38 and enlarging the passage 36 to allow all mercury to pass through, the switch could be made to produce a slight delay in establishing an On circuit. This time delay is equally established for the three-way or four-way switch shown in FIGURE 7. Time delay of the switch may be adjusted to suit personal taste or need by using the proper metering passage 39 or by adjusting the valve 44—45 (when the metering valve modification is used) to reduce the time delay to substantially zero or to increase the time delay to several minutes.

Figure 9:
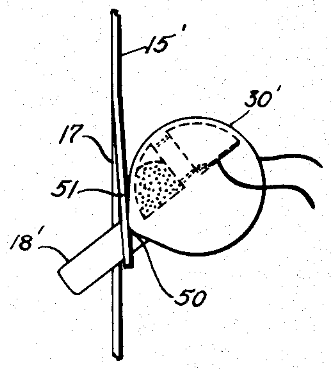
FIGURE 9 illustrates a simplified version of the switch actuator means.

FIGURE 9 illustrates a simplified modification of the switch of this invention in which the toggle mechanism, including the toggle 18, the pin 19, and the pins 31, may be eliminated where it is not necessary or desirable to obtain a mechanical advantage in the toggle mechanism to cause a large rotative angle of the mercury capsule 30 to a short rotative angle of the toggle 18. In FIGURE 9 the mercury capsule 30' is slightly modified from the mercury capsule 30 in that it has the toggle handle 18' made integral therewith or otherwise fixed to the capsule 30'. The mercury capsule 30' likewise has a cam lobe portion 50 thereon at the root of the toggle lever 18' to operate as a detent to hold the switch in either the On or Off position. The cam lobe 50 cooperates with an extension 51 of the switch support plate 15' adjacent the toggle slot 17 which extension is biased inwardly to frictionally engage the periphery of the mercury capsule 30'. The mercury capsule 30' may be rotatively mounted to a switch capsule container as shown by 25 in FIGURES 1 and 2.

Such a detent means might also be used in the construction of the modification shown in FIGURES 1 and 2.

While many modifications and changes may be made in the constructional details and features of our invention utilizing the teaching exemplified herein without departing from the spirit and scope of the invention, it is understood that we desire to be limited only by the scope of the appended claims. It is also to be understood that many uses will present themselves and in many cases will eliminate a plurality of conventional switches to withhold electric current cutoff until a person has reached a specific point or permitted specific acts. For examples of application, a person could turn a light switch Off and cross the room, leave the house, walk to another building or place, etc. before the light is extinguished. The time delay switch as shown in FIGURE 2 could be used at lamp sockets, in lamp bases, or other convenient places of use.

Having thus described our invention, what we desire to secure by Letters Patent is:

1. A time delay electrical switch comprising: a pivotable capsule having two compartments separated by a wall, said compartments having a conductive liquid therein; an unrestricted conductive liquid passage in the normally lower end of said wall and an adjustable air metering passage in the normally upper end of said wall whereby the flow of conductive liquid between compartments is controlled by said air metering passage in the passage of air between compartments; and electrodes in at least one compartment adaptable to be bridged by said conductive liquid, said electrodes being connected through said capsule.

2. A time delay electrical switch comprising: a pivotable capsule having two fluid compartments therein separated by a wall; a pair of electrodes in at least one of said compartments, each electrode extending through the capsule to the exterior; an electrically conductive liquid in said compartments; an unrestricted communicating passage near the bottom of said wall between said compartments to permit free flow of said conductive liquid therebetween; and an adjustable air metering passage connecting said fluid compartments at the top of said wall for metering air tending to be displaced by said conductive liquid whereby flow of said conductive liquid between compartments is controlled by said air through said metering passage.

3. A time delay electrical switch as set forth in claim 2 wherein said electrically conductive liquid is mercury.

4. A time delay electrical switch as set forth in claim 3 wherein said unrestricted communicating passage near the bottom of said wall is up from the bottom of said wall sufficient to retain some mercury in one compartment when said pivotable capsule is pivoted in one direction to flow said mercury to the other compartment, said retained mercury being sufficient to bridge immediately said electrodes when said capsule is pivoted in the other direction.

5. A time delay electrical switch comprising: a rockable container having two compartments therein divided by a wall adapted to assume either of two extreme positions of said rockable container forward and backward of a meridian plane, said wall having a lower unrestricted liquid passage and an upper adjustable air metering passage, said lower liquid passage being up from the bottom of said wall a predetermined distance; an electrically conductive liquid in said compartments seeking the lower level by gravity, said conductive liquid all being transferred through said liquid passage but a last globule retained by said predetermined distance of wall in either extreme position of said rockable container; and electrical electrodes in at least one of said two compartments adapted to be bridged by said conductive liquid whereby breaking of bridgement of said conductive liquid from said electrodes when said rockable container is rocked from one of its extreme positions to the other is delayed by the metering of air between said two compartments, and immediate bridgement of said electrodes by said retained last globule of conductive liquid is established when said rockable container is rocked to its other extreme position.

6. A time delay flow control of mercury comprising: a hermetically sealed vessel containing a charge of mercury; a partition separating said vessel into two compartments, said vessel being rockable with said partition nutatable about a vertical plane; a passage through said partition at the lower end thereof of a size no larger than to permit the free flow of said mercury therethrough, and an adjustable air metering passage at the top end of said partition to change the cross-sectional area of said metering passage to meter the air between said compartments tending to be displaced by said flow of mercury between said compartments upon said vessel being rocked whereby mercury flow is delayed in accordance with the metering of air between compartments.

References Cited in the file of this patent

UNITED STATES PATENTS

| | | |
|---|---|---|
| 2,116,396 | Hill et al. | May 3, 1938 |
| 2,615,100 | Weaver | Oct. 21, 1952 |
| 2,644,866 | Turnupseed et al. | July 7, 1953 |
| 2,800,537 | Hesh | July 23, 1957 |
| 2,831,077 | Salyer | Apr. 15, 1958 |
| 2,849,550 | Olmer et al. | Aug. 26, 1958 |
| 2,851,547 | Hartz | Sept. 9, 1958 |

Notice of Adverse Decision in Interference

In Interference No. 93,537 involving Patent No. 3,003,044, F. A. Davis and H. H. Losche, DELAY ELECTRIC SWITCH, final judgment adverse to the patentees was rendered May 27, 1966, as to claims 1, 2, 3 and 6.

[*Official Gazette October 25, 1966.*]

Disclaimer 3,003,044.—*Frank A. Davis*, Flat Rock, and *Herold H. Losche*, Greenwood, Ind. DELAY ELECTRIC SWITCH. Patent dated Oct. 3, 1961. Disclaimer filed Nov. 1, 1966, by the inventors.

Hereby enter this disclaimer to claims 1, 2, 3 and 6 of said patent.

[*Official Gazette December 6, 1966.*]